(12) United States Patent
Szurpicki

(10) Patent No.: US 8,201,639 B2
(45) Date of Patent: Jun. 19, 2012

(54) ROTARY LAWN EDGER TOOL

(76) Inventor: John Szurpicki, Clinton Township, MI (US)

( * ) Notice: Subject to any disclaimer, the term of this patent is extended or adjusted under 35 U.S.C. 154(b) by 200 days.

(21) Appl. No.: 11/518,827

(22) Filed: Sep. 11, 2006

(65) Prior Publication Data

US 2007/0062713 A1 Mar. 22, 2007

Related U.S. Application Data

(60) Provisional application No. 60/715,782, filed on Sep. 12, 2005.

(51) Int. Cl.
*A01B 1/00* (2006.01)

(52) U.S. Cl. .......................... 172/380; 172/13

(58) Field of Classification Search .............. 172/13, 172/14, 15, 16, 17, 41, 371, 378, 380
See application file for complete search history.

(56) References Cited

U.S. PATENT DOCUMENTS

| | | | |
|---|---|---|---|
| 709,976 A | 9/1901 | Fernstrom | |
| 877,799 A * | 1/1908 | Rider | 83/837 |
| 1,060,445 A | 4/1913 | Fields | |
| 1,286,779 A * | 12/1918 | Rhomberg | 172/371 |
| 1,487,713 A | 1/1922 | Bucher | |
| 1,447,805 A * | 3/1923 | Miller | 172/13 |
| 1,632,129 A * | 6/1927 | Green | 172/15 |
| 2,088,534 A | 7/1937 | Pittman | |
| 2,253,116 A | 8/1940 | Findlay | |
| 2,312,569 A * | 3/1943 | Maga | 172/15 |
| 2,507,007 A | 5/1950 | Hardersen | |
| 2,529,542 A * | 11/1950 | De Conti | 172/380 |
| 2,555,441 A * | 6/1951 | Hackney | 172/15 |
| 2,718,838 A * | 9/1955 | Schumacher | 172/16 |
| 2,737,105 A | 3/1956 | Wilson | |
| 2,745,331 A | 5/1956 | Lancour | |
| 2,913,058 A * | 11/1959 | Smith et al. | 172/15 |
| 2,976,666 A * | 3/1961 | MacHovec | 56/295 |
| 3,077,230 A | 2/1963 | Guenon | |
| 3,078,573 A * | 2/1963 | Ervin | 30/347 |
| 3,102,376 A * | 9/1963 | Henderson | 56/294 |
| 3,127,939 A * | 4/1964 | Denter | 172/13 |
| 3,133,597 A * | 5/1964 | Smith | 172/14 |
| 3,183,655 A * | 5/1965 | Kern et al. | 56/295 |
| 3,319,365 A * | 5/1967 | Perry et al. | 37/94 |
| 3,338,039 A * | 8/1967 | Nightingale et al. | 56/295 |
| 3,537,244 A * | 11/1970 | Hicks | 56/17.1 |
| 3,554,293 A * | 1/1971 | Aman et al. | 172/13 |
| 3,590,926 A | 7/1971 | Tepera | |
| 3,743,027 A * | 7/1973 | Hatfield | 172/13 |

(Continued)

*Primary Examiner* — Robert Pezzuto
*Assistant Examiner* — Jamie L McGowan
(74) *Attorney, Agent, or Firm* — Butzel Long

(57) ABSTRACT

A cutting attachment for rotary edgers having a planar base and a plurality of cutting fins or evacuating blades that extend outward from an outboard side of the base. A plurality of teeth are formed along a peripheral edge of the base and are defined in part by leading edges which face a direction of rotation. The cutting fins extend outwardly from the base at an acute angle so that distal ends thereof are angled in a direction opposite of the direction of rotation. The cutting fins are also spaced apart from the leading edges of the teeth of the base. The cutting fins are further attached along bases thereof at acute angles with respect to the leading edges of the teeth of the base so that radially outermost ends of the bases of the cutting fins are spaced further from the leading edges of the teeth than inner most ends of the bases of the cutting fins.

22 Claims, 2 Drawing Sheets

U.S. PATENT DOCUMENTS

| | | | |
|---|---|---|---|
| 3,923,102 A * | 12/1975 | Morris | 172/13 |
| 3,960,218 A * | 6/1976 | Atchley et al. | 172/13 |
| 4,002,205 A | 1/1977 | Falk | |
| 4,049,059 A * | 9/1977 | Weibling | 172/15 |
| 4,072,195 A | 2/1978 | Carlson | |
| 4,083,166 A * | 4/1978 | Haas | 56/13.7 |
| 4,209,903 A * | 7/1980 | Owens | 30/302 |
| 4,653,590 A | 3/1987 | Shank | |
| 4,905,768 A * | 3/1990 | Lorenz | 172/25 |
| 5,056,605 A * | 10/1991 | Bond et al. | 172/111 |
| 5,188,340 A * | 2/1993 | Green | 254/132 |
| 5,350,021 A | 9/1994 | Walker | |
| 5,493,783 A * | 2/1996 | Oostendorp | 30/276 |
| 5,833,009 A | 11/1998 | Rebot | |
| 5,875,700 A | 3/1999 | Powell | |
| 6,062,318 A * | 5/2000 | Andrews | 172/15 |
| 6,092,608 A | 7/2000 | Leger | |
| 6,179,059 B1 * | 1/2001 | Notaras et al. | 172/17 |
| 6,302,219 B1 | 10/2001 | Filippini | |
| D460,090 S * | 7/2002 | Holzinger | D15/138 |
| 6,464,015 B1 | 10/2002 | Jones | |
| 6,857,480 B2 * | 2/2005 | Thompson et al. | 172/13 |
| 6,857,481 B1 | 2/2005 | Hayes | |
| 7,392,853 B2 * | 7/2008 | Baran | 172/41 |

* cited by examiner

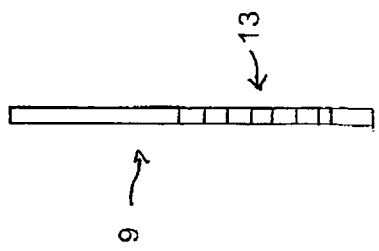
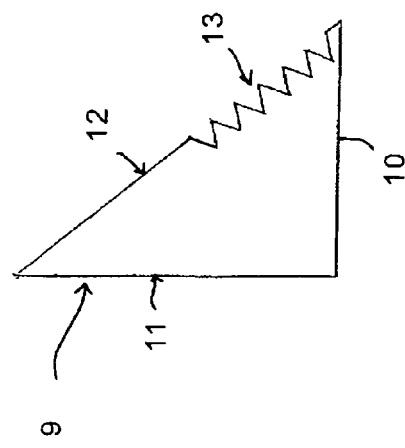
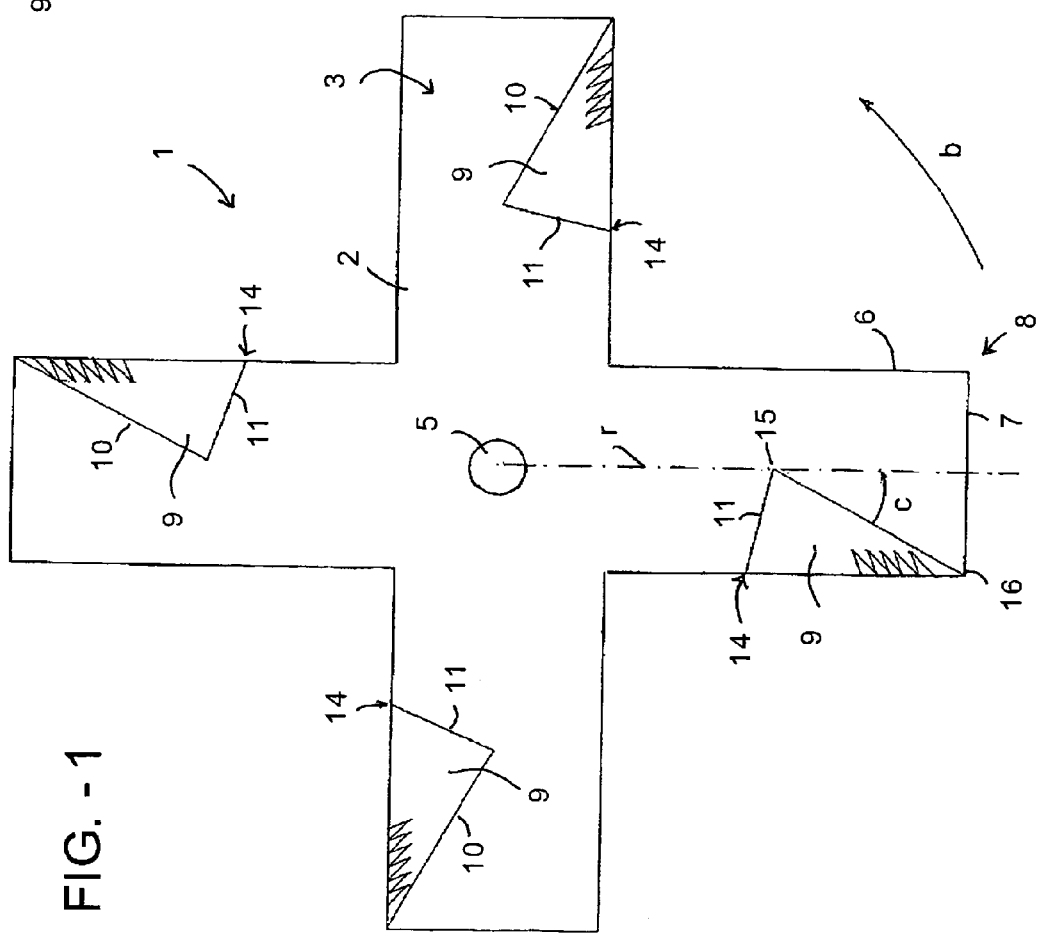

ROTARY LAWN EDGER TOOL

RELATED APPLICATION

This application is based on and claims priority through 35 U.S.C. §120 to U.S. Provisional Patent Application Ser. No. 60/715,782, filed Sep. 12, 2005, entitled Bed Raptor.

TECHNICAL FIELD

The present invention relates to rotary edgers of the type that are used to cut furrows or trenches between the edge of a sidewalk and an adjacent lawn or area of soil or around the periphery of a landscape area. In particular, the present invention is directed to a rotary edger tool or attachment for rotary edgers which is configured to cut a smooth edge and remove adjacent turf and soil so as to form a clean furrow or trench.

BACKGROUND ART

Edgers of the type that are used to cut furrows or trenches between a sidewalk and adjacent area of soil are well known and extensively used. Such edgers typically include an electric motor or gas engine that drives the rotation of a horizontal shaft to which a cutting tool or blade is attached. The cutting tool or blade is typically configured to cut a groove in the turf adjacent and parallel to a sidewalk and can be further configured to remove an outward width of the turf and soil to form a clean furrow or trench. Edgers generally include wheels by which they are moved along sidewalks and are configured to support the horizontal shaft and cutting tool or blade at an appropriate height to produce a furrow or trench having a desired depth.

Because the furrows or trenches produced by edgers along sidewalks and landscaped areas readily collect debris as a result of environmental conditions, it is necessary to re-edge these areas frequently to maintain a well manicured appearance having clean, distinct furrows or trenches.

As can be appreciated, re-edging, if performed on a frequent basis, requires removal of accumulated debris that is generally loose as compared to soil and turf that has to be cut and removed in areas that have not been previously edged. Therefore, general use rotary edger tools that are used for "maintenance use" more so that developing new sidewalk and bed edgings, are not necessary designed and configured for the heavier duty task of forming or developing new sidewalk and bed edgings.

Examples of various types of rotary edger tools, blades and attachments are exemplified in U.S. Pat. Nos. 6,857,481 to Hayes, 6,464,015 to Jones, 6,302,219 to Filippini, 6,092,608 to Leger, 4,653,590 to Shank, 4,072,195 to Carlson, 4,002,205 to Falk, 3,590,926 to Tepera, 2,745,331 to Lancour, 2,507,007 to Hardersen and 2,088,534 to Pittman.

The present invention provides a rotary lawn edger tool that has a unique configuration and is capable of developing new sidewalk and bed edgings with ease as well as maintaining preexisting sidewalk and bed edgings.

DISCLOSURE OF THE INVENTION

According to various features, characteristics and embodiments of the present invention which will become apparent as the description thereof proceeds, the present invention provides a cutting tool attachment for a rotary edger which comprises:

a substantially planar base having an inboard side and an outboard side and a plurality of teeth formed along a peripheral edge of the base which plurality of teeth include leading edges which face a direction of rotation of base; and a plurality of cutting fins that extend outwardly from the outboard side of the base at an acute angle so that distal ends of the plurality of cutting teeth are angled in a direction opposite of the direction of rotation of the base, the plurality of cutting fins being spaced apart from the leading edges of the plurality of teeth formed in the periphery of the base.

The present invention further provides a cutting tool attachment for a rotary edger which comprises:

a substantially planar base having an inboard side and an outboard side and a plurality of teeth formed along a peripheral edge of the base which plurality of teeth include leading edges which face a direction of rotation of base; and a plurality of cutting fins that extend outwardly from the outboard side of the base at an acute angle so that distal ends of the plurality of cutting teeth are angled in a direction opposite of the direction of rotation of the base, each of the plurality of cutting fins has a base which is attached to the substantially planar base and each of the plurality of cutting fins is attached to the substantially planar base so that the base of the cutting fins form acute angles with respect to the leading edges of the teeth along the periphery of the substantially planar base so that radially outermost ends of the bases of the cutting fins are spaced further from the leading edges of the teeth along the periphery of the substantially planar base than inner most ends of the bases of the cutting fins

BRIEF DESCRIPTION OF DRAWINGS

The present invention will be described with reference to the attached drawings which are given as non-limiting examples only, in which:

FIG. 1 is a planar side view of an edger tool according to one embodiment of the present invention.

FIG. 3A is front view of a cutting fin according to one embodiment of the present invention.

FIG. 3B is a front side view of the cutting fin of FIG. 3A.

BEST MODE FOR CARRYING OUT THE INVENTION

Figure 2:
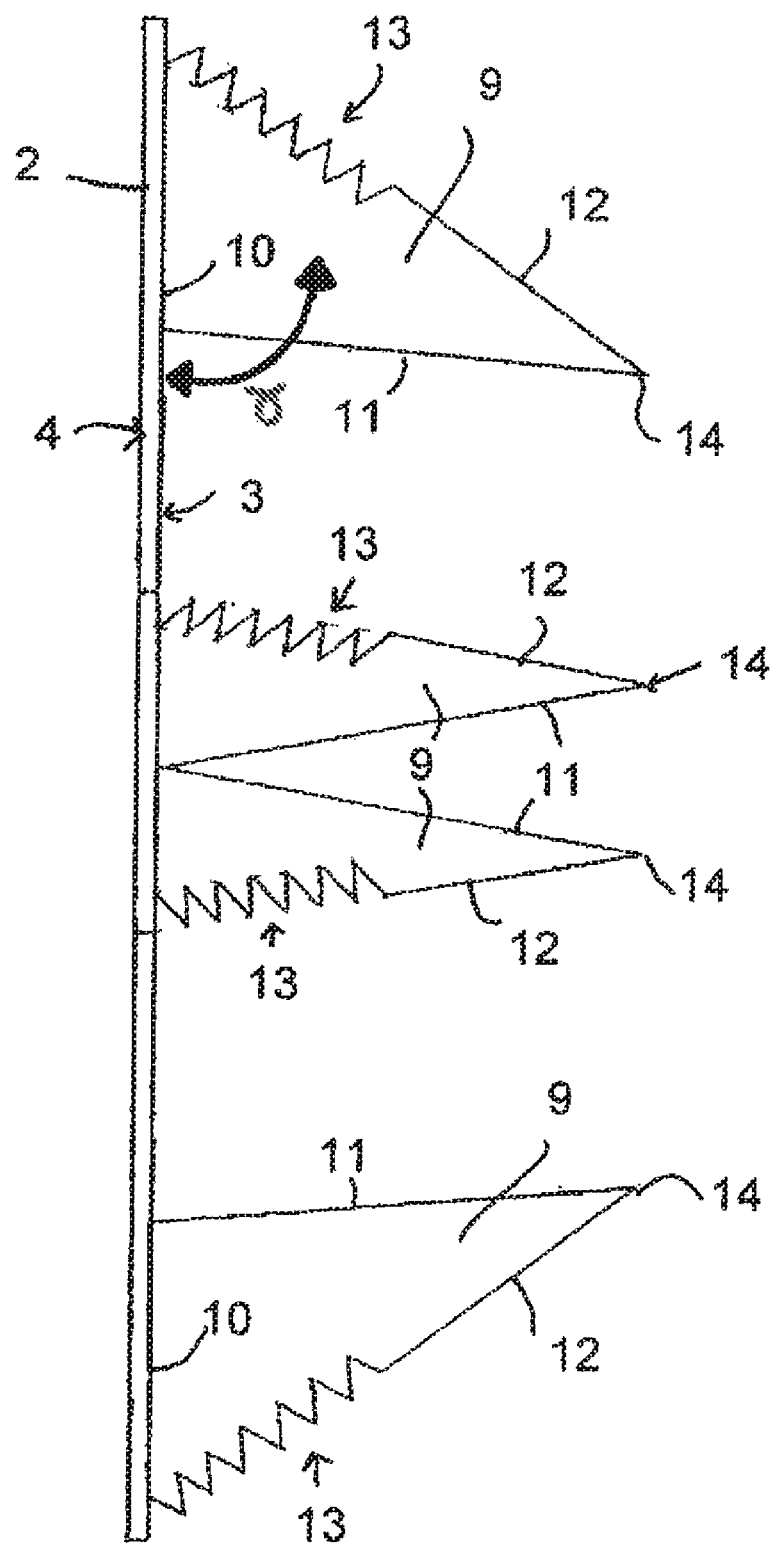
FIG. 2 is a top view of the edger tool of FIG. 1.

The present invention is directed to rotary edger tool or attachment for an electric or gas powered edger. The rotary edger tool includes a base which is configured to be attached to a rotatable shaft of an electric or gas powered edger. In this regard the base can have a central through-hole through which a threaded end of a rotatable shaft can extend in a conventional manner to mount the base thereon. Alternatively, the base can have any necessary configuration of through-holes to mount the base on a rotatable shaft support member or bracket, including an asymmetrical configuration of through-holes.

The base can be of any shape as long as it is weight-balanced or asymmetrical for rotation about the shaft of an edger. In a preferred configuration, the base is substantially planar and includes an inboard side, which faces the motor or engine of an edger, and an outboard side which faces away from the motor or engine of an edger. The periphery of the base is contoured to have teeth formed therein. Such teeth can be formed by providing evenly spaced apart radially inwardly curved portions in the periphery of the base, or angled, e.g. triangular, rectangular, portions in the periphery of the base or any combination of compound angular or curved portions in the periphery of the base. During the course of the present invention, it was determined that a base having a configuration which provided peripheral edge portions having substantially right angled configurations with leading edges (in the direction of rotation) that are substantially parallel to a diameter that extends through the base was particularly suitable for purposes of the present invention. Accordingly, bases that are configured to have peripheral edge portions having substantially right angled, or substantially right angled, e.g. 70°-110°, configurations on the leading edge are described in the exemplary embodiments below which includes a base having an X or cross shape.

A plurality of cutting fins or evacuating blades extent outward from the outboard side of the base. The cutting fins are generally planer and have triangular shapes. One leg of the triangular shaped cutting fins serves as a base to which the cutting fins are attached to the outboard side of the base. The cutting fins preferably have substantially right triangular shapes, including a shorter leg which serves as the base to which the cutting fins are attached to the outboard side of the base, a longer leg and a hypotenuse. The hypotenuse of the cutting fins has a plurality of teeth formed therein which extend from the base toward the distal end of the cutting fins. The plurality of teeth can, do not have to, extend along the entire length of the hypotenuse. During the course of the present invention it was determined that having the teeth extend about midway along the hypotenuse provided cutting fins that are particularly suitable for purposes of the present invention. In alternative embodiments the cutting fins can have other than triangular shapes. For example, the cutting fins can be rectangular, trapezoidal shaped, have curved shapes, or can be any combination of curved and linear sides/edges.

The cutting fins extend from the outboard side of the base at an acute angle ($\alpha$, see FIG. 2) so that the distal ends of the cutting fins are angled away from the direction of rotation of the base. The angle ($\alpha$) at which the cutting fins extend from the base can be less than 90° and between about 5° and 70°, it being understood that the angle at which the cutting fins extend from the base will determine the width of a furrow or trench formed by the rotary edger tool. Moreover, the ability or efficiency of the rotary edger tool to evacuate or remove soil as a furrow or trench is developed is a function of the angle at which the cutting fins extend from the base. Accordingly, during the course of the present invention it was determined that cutting fins that extended from the base at an angle ($\alpha$) of about 15° was particularly useful for purposes of the present invention. However, angles ($\alpha$) of between about 10° to 30° are also useful as generally are angles up to about 45°. Since the profile of the rotary edger tool, and particularly the profile of the cutting fins determine the width (and shape) of a furrow or trench formed thereby, it can quickly be understood that when the heights of the cutting fins is are increased, the angle can be likewise increased to maintain a desired furrow or trench width.

The cutting fins are attached to the base so that they are spaced away from the leading edges of the substantially right angled configurations which define the teeth on the periphery of the base. Moreover the cutting fins are attached to the base so that base of the cutting fins forms an acute angle with respect to a radial line that passes through the center of the base of the rotary edger tool. This configuration, which will be discussed in detail below, allows the leading edges of the substantially right angled configurations which define the teeth on the periphery of the base to develop an initial slice in the turf or soil before the cutting fins contact the turf or soil to evacuate or remove the same. This configuration allows the rotary edger tool of the present invention to develop new sidewalk and bed edgings with ease as well as maintaining preexisting sidewalk and bed edgings.

FIG. 1 is a planar side view of an edger tool according to one embodiment of the present invention. The rotary edger tool depicted in FIG. 1 and generally identified by reference numeral 1 includes a base 2 which, in reference to being attached to a electric or gas powered edger tool (not shown), has an outboard side 3 and an inboard side 4 (See FIG. 2). The base 2 depicted in FIG. 1 includes a single, centrally located through-hole 5 through which a threaded end of a rotatable shaft of an electric or gas powered edger can extend in a conventional manner to mount the base thereon. Alternatively, the base 2 can have any necessary configuration of through-holes to mount the base 2 on a rotatable shaft support member or bracket, including an asymmetrical configuration of through-holes.

The periphery of the base 2 is contoured to have teeth 8 formed therein. In the embodiment of the invention of FIG. 1, the base has an "X" or cross-shaped configuration. This shape provides teeth 8 which are defined by the leading edge 6 of the teeth 8 which moves in the direction of rotation of the base 2 as identified by arrow "b" and the outermost edge portions 7 of the base 2. As discussed above, such teeth 8 can alternatively be formed by providing evenly spaced apart radially inwardly curved portions in the periphery of the base 2, or angled, e.g. triangular, rectangular, portions in the periphery of the base 2 or any combination of compound angular or curved portions in the periphery of the base 2. During the course of the present invention, it was determined that a base 2 having a configuration which provided peripheral edge portions having substantially right angled configurations with leading edges (in the direction of rotation) that are substantially parallel to a diameter that extends through the base as shown in FIG. 2 was particularly suitable for purposes of the present invention. Accordingly, bases 2 that are configured to have peripheral edge portions having substantially right angled, or substantially right angled, e.g. 70°-110°, configurations on the leading edge 6 are described in the exemplary embodiment shown in the drawings. It is to be readily understood, that the trailing side or edge of the teeth 8 can have any convenient shape and therefore, the base 2 is not limited to the "X" or cross shape depicted in the drawings.

A plurality of cutting fins (which are also referred to as evacuation blades) 9 extend outward from the outboard side of the base 2. As shown in FIGS. 3A and 3B, the cutting fins 9 are generally planer and have triangular shapes. One leg of the triangular shaped cutting fins serves as a base 10 to which the cutting fins 9 are attached to the outboard side of the base 2. The cutting fins 9 preferably have substantially right triangular shapes, including a shorter leg which serves as the base 10 to which the cutting fins are attached to the outboard side of the base, a longer leg 11 which determines the height of the cutting fins 9 on the base 2, and a hypotenuse 12. The hypotenuse 12 of the cutting fins 9 has a plurality of teeth 13 formed therein which extend from the base 10 toward the distal end of the cutting fins 2. The plurality of teeth 13 do not have to extend along the entire length of the hypotenuse 12, although they can if desired. During the course of the present invention it was determined that having the teeth 13 extend about midway along the hypotenuse 12 provided cutting fins 9 that are particularly suitable for purposes of the present invention.

As shown in FIGS. 1 and 2, the cutting fins 2 extend from the outboard side of the base 2 at an acute angle so that the distal ends 14 of the cutting fins 9 are angled away from the direction of rotation of the base 2. In the embodiment of the invention depicted in FIGS. 1 and 2 the cutting fins 9 extend from the base 2 at an angle of about 15°. However, it is to be noted that the angle at which the cutting fins 9 extend from the base 2 can be less than 90° and between about 5° and 70°, it being understood that the angle at which the cutting fins 9 extend from the base 2 will determine the width of a furrow or trench formed by the rotary edger tool. Moreover, the ability or efficiency of the rotary edger tool to evacuate or remove soil as a furrow or trench is developed is a function of the angle at which the cutting fins 9 extend from the base 2. Accordingly, during the course of the present invention it was determined that cutting fins 9 that extended from the base 2 at an angle of about 15° was particularly useful for purposes of the present invention. However, angles of between about 10° to 30° are also useful as generally are angles up to about 45°. Since the side profile of the rotary edger tool, and particularly the profile of the cutting fins 9 determine the width (and shape) of a furrow or trench formed thereby, it can quickly being understood that when the heights of the cutting fins 9 is increased, the angle can be likewise increased to maintain a desired furrow or trench width. In alternative embodiments the cutting fins can have other than triangular shapes. For example, the cutting fins can be rectangular, trapezoidal shaped, have curved shapes, or can be any combination of curved and linear sides/edges.

For exemplary purposes it is note that a rotary edger tool made in conformance with the non-limiting illustrated embodiment (as a non-limiting working example) had cutting fins 9 that were about 2.75 inches in height (leg 11) and had a base 10 of about 2 inches. In this non-limiting embodiment, the cutting fins 9 extended outward from the outboard side 3 of the base 2 at an angle of about 15° away from the direction of rotation of the base 2. The cutting fins 9 had teeth 13 that were about 0.25 inches deep which were spaced about 0.25 inches apart, with a total of nine teeth 13.

As shown in FIG. 1, the cutting fins 9 are attached to the base 2 so that they are spaced away from the leading edges 6 of the substantially right angled configurations which define the teeth 8 on the periphery of the base 2. Moreover, the cutting fins 9 are attached to the base 2 so that base 10 of the cutting fins 9 forms an acute angle with respect to a radial line "r" that passes through the center of the base 2 of the rotary edger tool (an with respect to the leading edges 6). This configuration is illustrated by angular arrow "c" in FIG. 1 and allows the leading edges 6 of the substantially right angled configurations which define the teeth 8 on the periphery of the base 2 to develop an initial slice in the turf or soil before the cutting fins 9 contact the turf or soil to evacuate or remove the same. This configuration allows the rotary edger tool of the present invention to develop new sidewalk and bed edgings with ease as well as maintaining preexisting sidewalk and bed edgings.

In the non-limiting working example noted above, the base 10 of the cutting fins 9 was positioned so that the radially inward end 15 was about centered (about 0.8 inches from the leading edge 6) on the illustrated portion of the base 2 (which was about 2 inches wide between the leading edge 6 and trailing edge) and the radially outward end 16 of the base 10 was at the intersection of the outermost edge portions 7 of the base 2 and the training edge, so that angle "c" was about 35°. It is to be noted that angle "c" is not necessarily limited to 35°. Angles of less than 90° and less than about 55° or less than about 45° could also be used with a range of between about 20° to 45° and about 30° to 40° being suitable for purposes of the present invention.

The elements of the rotary edger tool, including the base 2 and cutting fins can be made from any suitable, durable metal such as steel, stainless steel, carbon steel, etc. The base 2 can have a diameter of about 9 inches or any conventional diameter which is useful for rotary edger tools. The base 2 and cutting fins 9 can be up to 0.25 inches thick with a thickness of 0.124 (⅛) inch being used in the non-limiting working example discussed above. The cutting fins 9 can be welded to the base 2 or formed from portions of the base 2 which are bent outward from the outboard side of the base 2. In general, the dimensions of the base and cutting fins 9 can be easily varied by the skilled in the art without departing from the scope of the invention as disclosed.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

What is claimed is:

1. A one piece cutting tool attachment for a rotary edger, comprising:
   a substantially planar base having an inboard side for facing a rotary edger, an opposing outboard side and a peripheral edge, and a plurality of teeth formed along the peripheral edge of the substantially planar base, the plurality of teeth including leading edges which face a direction of rotation of the substantially planar base, the planar base having a substantially cross shape, and wherein the teeth are formed by the peripheral edge intersecting the leading edges at a substantially right angle;
   a plurality of cutting fins that extend outwardly from the outboard side of the substantially planar base, the plurality of cutting fins being spaced apart from the leading edges of the plurality of teeth; wherein the cutting fins have a substantially triangular shape with a hypotenuse having a plurality of teeth extending at least partially along the length of the hypotenuse.

2. A cutting tool attachment for a rotary edger according to claim 1, wherein and each of the plurality of cutting fins is attached to the substantially planar base along a base, so that the base of the cutting fins form acute angles with respect to the radii of the substantially planar base that intersect radially inner most ends of the bases of the cutting fins.

3. A cutting tool attachment for a rotary edger according to claim 1, wherein the plurality of cutting fins have teeth formed in the radially outwardly facing edges thereof.

4. A cutting tool attachment for a rotary edger according to claim 3, wherein the teeth formed on the cutting fins extend only part way along the edge of the cutting fins.

5. A cutting tool attachment for a rotary edger according to claim 4, wherein the teeth formed on the cutting fins are adjacent the base of the cutting fins.

6. A cutting tool attachment for a rotary edger according to claim 1, wherein the plurality of cutting fins have triangular shapes.

7. A cutting tool attachment for a rotary edger according to claim 1, wherein the substantially planar base has a cross shape.

8. A cutting tool attachment for a rotary edger according to claim 1, wherein the plurality of cutting fins are formed separately from and attached to the substantially planar base.

9. A cutting tool attachment for a rotary edger according to claim 1, wherein the plurality of cutting fins extend outwardly from the outboard side of the substantially planar base at an acute angle so that distal ends of the plurality of cutting fins are angled away from the substantially planar base, and wherein further the acute angle at which the plurality of cutting fins extend outwardly from the outboard side of the base is from about 10° to 30°.

10. A cutting tool attachment for a rotary edger according to claim 9, wherein the acute angle at which the plurality of cutting fins extend outwardly from the outboard side of the substantially planar base is about 15°.

11. A cutting tool attachment for a rotary edger according to claim 2, wherein the acute angle formed between the base of the cutting fins and the radii of the substantially planar base is from about 20° to 45°.

12. A cutting tool attachment for a rotary edger according to claim 11, wherein the acute angle formed between the base of the cutting fins and the radii of the substantially planar base is about 30° to 40°.

13. The cutting tool attachment of claim 1, wherein the plurality of cutting fins are characterized in that radially outwardly facing edges thereof are angled inwardly away from the peripheral edge of the substantially planar base.

14. A cutting tool attachment for a rotary edger according to claim 1, wherein the teeth are formed by the peripheral edge intersectin the leading edges at an angle between about 70° to 110°.

15. A one piece cutting tool attachment for a rotary edger, comprising:
   a substantially planar base having an inboard side for facing a rotary edger, an opposing outboard side and a peripheral edge, and a plurality of teeth tbrmed along the peripheral edge of the substantially planar base, the plurality of teeth including leading edges which face a direction of rotation of the substantially planar base, the planar base having a substantially cross shape and wherein the teeth are formed by the peripheral edge intersecting the leading edges at a substantially right angle;
   a plurality of cutting fins that extend outwardly from the outboard side of the base at an acute angle so that distal ends of the plurality of cutting fins are angled in a direction opposite of the direction of rotation of the substantially planar base, each of the plurality of cutting fins having a base which is attached to the substantially planar base so that an end of the base of each of the plurality of cutting fins intersects the peripheral edge of the substantially planar base so that the bases of the cutting fins form acute angles with respect to the leading edges of the teeth formed along the periphery of the substantially planar base; wherein the plurality of cutting fins are chararcterized in that radially outwardly facing edges thereof are angled inwardly away from the peripheral edge of the sibstantially planar base; and wherein the cutting fins have a substantially triangular shape with a hypotenuse havin a plurality of teeth extending at least partially along the length of the hypotenuse.

16. A cutting tool attachment for a rotary edger according to claim 15, wherein the plurality of cutting fins are spaced apart from the leading edges of the plurality of teeth formed in the periphery of the substantially planar base.

17. A cutting tool for a rotary edger according to claim 15, wherein the acute angle formed between the base of the cutting fins and the radii of the substantially planar base is about 30° to 40°.

18. A cutting tool attachment for a rotary edger according to claim 15, wherein the plurality of cutting fins have teeth thrmed in the radially outwardly facing edges thereof.

19. A cutting tool attachment for a rotary edger according to claim 15, wherein the plurality of cutting fins have triangular shapes.

20. A cutting tool attachment for a rotary edge according to claim 15, wherein the substantially planar base has a cross shape.

21. A one piece cutting tool attachment for a rotary edger, comprising:
   a substantially planar base having an inboard side for facing a rotary edger, an opposing outboard side and a peripheral edae, and a plurality of teeth formed along the peripheral edge of the substantially planar base, the plurality of teeth including leading edges which face a direction of rotation of the substantially planar base, wherein the teeth are defined by the 90° angle formed by the intersection of the peripheral edge with the leading edges;
   a plurality of cutting fins that extend outwardly from the outboard side of the substantially planar base, the plurality of cutting fins being spaced apart from the leading edges of the plurality of teeth; and wherein the tool forces debris outwardly away from an edge being cut by the cutting tool attachment.

22. A one piece cutting tool attachment for a rotary edger, comprising:
   a substantially planar base having an inboard side for facing a rotary edger, an opposing outboard side and a peripheral edge, and a plurality of teeth thrmed along the peripheral edge of the substantially planar base, the plurality of teeth including leading edges which face a direction of rotation of the substantially planar base, wherein the teeth are defined by the 90° angle formed by the intersection of the peripheral edge with the leading edges, the planar base having a substantially cross shape, and wherein the teeth are formed by the peripheral edge intersecting the leading edges at a substantially right angle;
   a plurality of cutting fins that extend outwardly from the outboard side of the substantially planar base, the plurality of cutting fins being spaced apart from the leading edges of the plurality of teeth such that the fins do not share a common vertex with the leading edge of the teeth and the cutting fins have a substantially triangular shape with a hypotenuse having a plurality of teeth extending at least partially along the length of the hypotenuse; and wherein the tool forces debris outwardly away from an edge being cut by the putting tool attachment.

* * * * *